United States Patent [19]

Roncaglione

[11] Patent Number: 4,597,128
[45] Date of Patent: * Jul. 1, 1986

[54] FLEXIBLE VEHICLE WASHING BRUSH AND COUPLING THEREFOR

[76] Inventor: James W. Roncaglione, 9807 Bridleridge Ct., Vienna, Va. 22180

[*] Notice: The portion of the term of this patent subsequent to Apr. 16, 2002 has been disclaimed.

[21] Appl. No.: 493,344

[22] Filed: May 10, 1983

[51] Int. Cl.⁴ .................................................. B60S 3/06
[52] U.S. Cl. ............................. 15/53 AB; 15/DIG. 2; 15/179
[58] Field of Search .......... 15/179, 181, 53 A, 53 AB, 15/DIG. 2, 97 B, 21 D, 21 E, 56, 88; 114/222; 134/6

[56] References Cited

U.S. PATENT DOCUMENTS

| | | |
|---|---|---|
| 2,637,056 | 5/1953 | Morain .................................. 15/179 |
| 3,089,168 | 5/1963 | Blanford . |
| 3,693,206 | 9/1972 | Tatara et al. . |
| 3,881,208 | 5/1975 | Miner . |
| 4,021,877 | 5/1977 | Miner . |
| 4,024,598 | 5/1977 | Miner . |
| 4,192,036 | 3/1980 | Heymann . |
| 4,198,722 | 4/1980 | Ennis . |
| 4,270,958 | 6/1981 | Ennis . |
| 4,299,003 | 11/1981 | Ennis . |
| 4,332,625 | 6/1982 | Ennis . |
| 4,354,291 | 10/1982 | Ennis . |

FOREIGN PATENT DOCUMENTS 749711  7/1980  U.S.S.R. .

Primary Examiner—Edward L. Roberts
Attorney, Agent, or Firm—Birch, Stewart, Kolasch & Birch

[57] ABSTRACT

A vehicle washing apparatus comprising overhead support means located above or adjacent to the path of a vehicle to be washed, an elongate vertically disposed flexible and rotatable washing member having a free lower end and being supported at the upper end thereof by said support means and rotating means for imparting rotary motion to said washing member.

8 Claims, 10 Drawing Figures

FLEXIBLE VEHICLE WASHING BRUSH AND COUPLING THEREFOR

BACKGROUND OF THE INVENTION

1. Field of the Invention

The present invention relates to a vehicle washing apparatus having brushes which are capable of washing vehicles of various sizes and shapes.

2. Brief Description of the Prior Art

Various overhead mounted brushes for washing the front, sides and rear of vehicles being washed are known in the art. In order to prevent damage to vehicles being washed and in order to obtain efficient washing of vehicles, it is desirable to mount these overhead brushes in such a way that when the brushes contact the vehicle, the brushes swing and/or slide out of the path of the vehicle. It is also desirable to mount these brushes in such a manner that the brush can bend or flex relative to the drive shaft thereof. U.S. Pat. Nos. 3,881,208, 4,021,877 and 4,024,598 to Miner disclose vehicle washing brushes of this general type. U.S. Pat. Nos. 4,198,722, 4,270,958, 4,332,625 and 4,299,003 to Ennis disclose additional vehicle washing brushes for accomplishing the above-mentioned result. U.S. Pat. No. 4,035,862 to Ennis et al discloses similar vehicle washing brushes.

One of the problems associated with the car wash apparatus disclosed in the above-described Ennis and Ennis et al patents is that when the brushes contact a vehicle moving relative thereto, the brushes bounce out of the path of the car without properly washing the car. The present invention is therefore directed to solving this and other problems which will be discussed further hereinbelow which are associated with prior vehicle washing apparatus.

SUMMARY OF THE INVENTION

The present invention is directed to a new type of vehicle washing apparatus which utilizes a flexible cable or support member to support vehicle washing material. The cables which are used to support the vehicle washing materials, such as brushes, may be braided metal cables which are flexible but which are not highly resilient. Heretofore, plastic shafts or tubes have been used to support brushes. These elastic shafts are resilient and thus when they are deformed they generate a force which causes the shaft to return to the normal straight position. However, when the cables of the present invention are deformed, they do not generate a significant force which causes them to return to the straight position. Plastic cables formed from braided reinforced nylon or another plastic or synthetic material may be used instead of the metal cables. Other materials which are substantially non-resilient when flexed in an amount which is encountered during washing of a vehicle may also be used. The cable can be a single continuous cable or a plurality of parallel cables. Alternately, a plurality of cables may be connected end to end or sections of cable may be used to connect sections of vehicle washing brushes. Any materials which have the same function, may be substituted for the cables. The degree of flexibility of the cable or support member will vary depending upon the length, weight and size of the brushes and the ultimate intended use of the brush.

During operation, when the brushes contact a vehicle, the cable is deformed in response to pressure from the vehicle. However, because of the non-resilient nature of the cable, the brush does not push back to a large extent against the vehicle. In contrast, metal shafts and plastic shafts are either rigid or resilient, respectively, and thus do not yield to the vehicle in the same manner as the flexible non-resilient support members of the present invention. By utilizing plastic cables the overall weight of the brushes can be reduced thereby reducing the strain on the overhead support arm and/or overhead support frame. By utilizing flexible cables to support the vehicle washing material or brushes, a vehicle washing apparatus is provided whereby sufficient flexibility is imparted to the brushes so that the brushes do not bounce out of the way of a vehicle when the vehicle contacts the brushes. Depending on how the brushes are mounted, a vehicle washing apparatus capable of washing the front, sides and rear surface of a vehicle being washed can be produced.

Preferably, the vehicle washing apparatus includes two brushes which are mounted in the path of a vehicle to be washed. The vehicle washing apparatus can be of the drive-through type wherein the vehicle washing apparatus is stationary and the vehicle is propelled therethrough. An example of this type of apparatus is disclosed in co-pending application Ser. No. 415,928 in the name of James W. Roncaglione which was filed on Sept. 8, 1982, the entire contents of which are hereby incorporated by reference. Another example of this type of apparatus is disclosed in U.S. Pat. No. 4,225,995 to George T. Ennis which issued on Oct. 7, 1980, the entire contents of which are hereby incorporated by reference. Alternatively, the vehicle washing apparatus can be of a type wherein the vehicle to be washed remains stationary and the apparatus moves relative thereto. An example of this type of apparatus is U.S. Pat. No. 4,320,551 to James W. Roncaglione which issued on Mar. 23, 1982, the entire contents of which are hereby incorporated by reference. In one embodiment of the present invention, when the front of the vehicle to be washed contacts the brushes, the brushes move apart slightly to allow the vehicle to pass therebetween. However, because of the flexible nature of the cable, the tops of the brushes will not move as far apart as the bottom of the brushes of certain prior art vehicle washing apparatuses. As the vehicle moves between the brushes, the brushes wash respective sides of the vehicle and after the vehicle has passed therebetween, the brushes wash the back of the vehicle. The vehicle can easily pass in either direction through the vehicle washing apparatus by changing the rotation of the brushes in a conventional manner.

The brushes can be mounted in the vehicle washing apparatus in a variety of manner. A preferred method of mounting the brushes is to mount each brush on an overhead brush support arm which is pivotal about a generally vertical axis. The two brushes are urged toward each other to a closed position in the path of the vehicle to be washed. Upon contact of the brushes with the vehicle being washed, the brush support arms and the brushes pivot out of the path of the vehicle to an open position and wash the sides of the vehicle as the vehicle passes therebetween. After the vehicle passes through the apparatus, the brushes return to the closed position.

The brushes are generally supported at the top only of the brush and do not contain a support for the bottom end of the brush. The overhead supported brushes of the present invention can also be employed in vehicle washing apparatuses of the type disclosed in the previously mentioned Miner patents or other known car wash apparatuses.

In one aspect of the present invention, the present invention is directed to a vehicle washing apparatus including overhead support means located above or adjacent to the path of a vehicle to be washed, an elongate vertically disposed flexible and rotatable washing member having a free lower end and being supported at the upper end thereof by said support means, said washing member comprising a flexible elongate cable, a plurality of washing material support members secured to said cable and washing material supported by said support members and rotating means for imparting rotary motion to the upper end of said rotatable washing member. The present invention is also directed to a vehicle washing apparatus including overhead support means; an elongate vertically disposed flexible and rotatable washing member supported by said support means, said elongate washing member comprising a flexible elongate cable having washing material thereon; and rotating means for imparting rotary motion to said rotatable washing member. The present invention is also directed to a vehicle washing member comprising a flexible elongate cable; a coupling member at only one end of said cable capable of imparting rotary motion to said cable; and washing material arranged along the length of said support means.

The present invention is also directed to a novel and unique method for connecting a cable with a coupling member. In a preferred embodiment of this method a metal cable is inserted into the narrow end of a truncated cone-shaped cavity in said coupling member. After the cable is inserted into the cone-shaped cavity of the coupling member, the strands of the metal cable are pulled apart and frayed to increase the surface area of the cable and to increase the diameter of the cable at the end thereof. The cable is then washed with appropriate solvents and a bonding material such as a molten metal is poured into the cone-shaped cavity to securely bond the metal cable to the coupling member. Other bonding materials such as plastic, epoxy and Liquid Steel may be used in some situations.

Thus, a vehicle washing member can be formed which comprises a flexible cable, a coupling member arranged around said cable adjacent one end thereof; and a bonding material securely bonding said cable to said coupling member. In a preferred embodiment the brush comprises a flexible cable; a coupling member having a cone-shaped cavity adapted to receive said coupling member; and bonding material in said cone-shaped cavity securely bonding said cable to said coupling member.

A yieldable coupling of the type disclosed and claimed in co-pending application Ser. No. 415,928 filed on Sept. 8, 1982 can optionally be utilized in accordance with the present invention. Shock absorbers and other devices can also be optically used in conjunction with the present invention.

By utilizing cables to support the vehicle washing brushes, a new and unique effect is observed when the brushes wash a vehicle passing therebetween. The brushes have a tendency to hang on the vehicle being washed therebetween and the flexibility of the cables allows the brushes to conform to the front, side and rear surfaces of the vehicle being washed. As mentioned previously, the tendency of the brushes to bounce away from a vehicle which contacts the brushes is lessened in accordance with the present invention. The metal cables are stronger than plastic shafts which have been suggested for use by Ennis and the metal cables do not become brittle in cold weather as is the case with certain types of plastics. Since the cables are flexible but non-resilient (as compared with plastic shafts), this property apparently contributes to the unique action of the brushes of the present invention whereby the brushes can conform slightly to the front, side and rear contours of a vehicle.

DETAILED DESCRIPTION OF THE INVENTION

Figure 1:
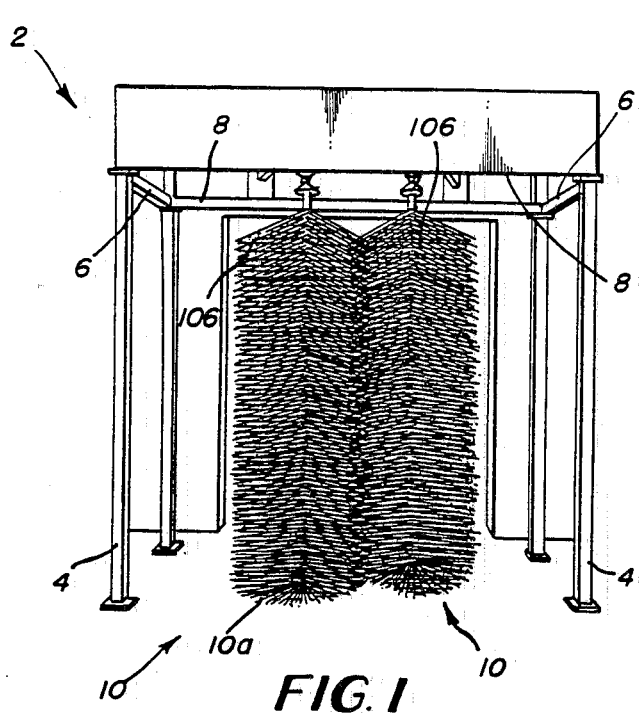
FIG. 1 is a front perspective view of the vehicle washing apparatus of the present invention with the brushes spinning before a vehicle contacts the brushes.

As shown in FIGS. 1-4, the present invention preferably includes an overhead support means 2 located above the path of a vehicle to be washed for supporting the upper ends of a pair of elongate vertically disposed flexible and rotatable brushes. The overhead support means comprises a plurality of vertical support posts 4 located on either side of the path of the vehicle to be washed, a pair of horizontal support members 6 connected with the upper ends of the vertical support posts 4. The horizontal support members 6 are arranged parallel to the path of the vehicle to be washed. The device also includes a pair of horizontal support members 8 which are located above the path of the vehicle to be washed and are arranged perpendicularly to the horizontal support members 6.

The vehicle washing apparatus also includes a pair of elongate vertically disposed flexible and rotatable brushes 10 having a free lower end 10a and an upper end 10b which is connected with the overhead support means.

Figure 3:
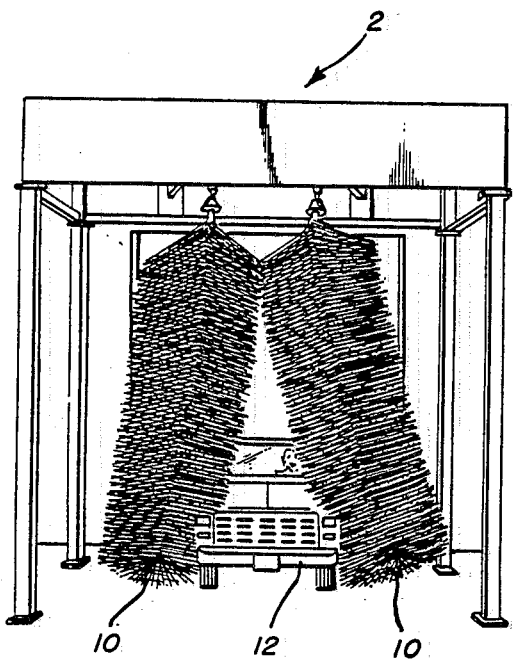
FIG. 3 shows the apparatus contacting the sides of a vehicle at about the front wheels thereof.
Figure 2:
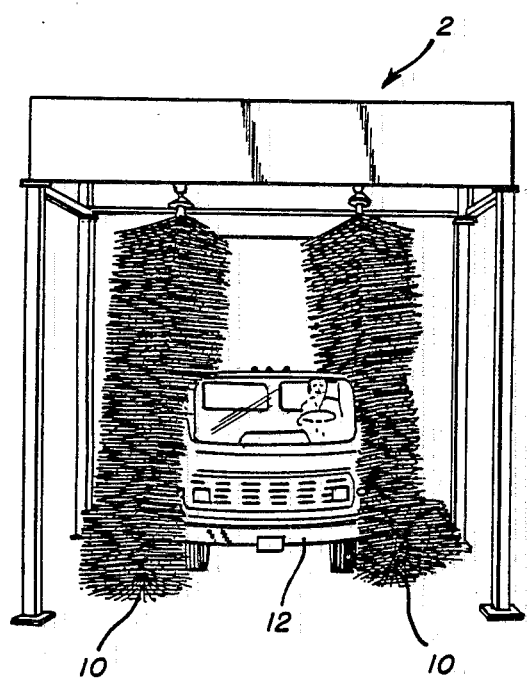
FIG. 2 shows the apparatus of FIG. 1 contacting the cab of a tractor trailer truck.
Figure 4:
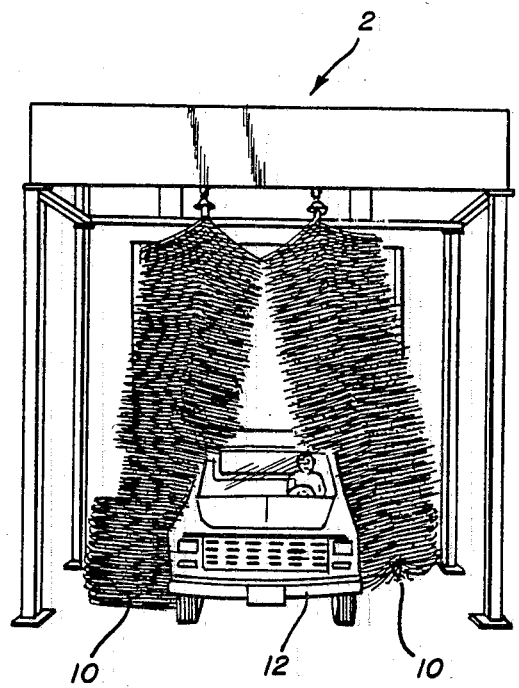
FIG. 4 is a front view of the apparatus wherein the vehicle in FIG. 3 has moved forward and the brushes contact the side doors of the vehicle.

In operation, the brushes are arranged in a first closed position (FIG. 1) wherein the brushes are in the path of a vehicle to be washed. When a vehicle 12 passing through the apparatus contacts the brushes, the brushes move apart and the vehicle can pass between the brushes (FIGS. 2-4). After the vehicle passes through the apparatus, the brushes return to the first closed position.

As previously mentioned, the brushes can be mounted in the apparatus in a variety of manners. Thus, the brushes can be mounted on overhead support tracks whereby they slide apart when a vehicle passes through the apparatus. This type of mounting is disclosed in the previously mentioned Miner patents. Alternatively, the brushes can be mounted by an overhead support arm arrangement shown in FIG. 5. The overhead support arm arragement comprises a stationary support frame (shown in FIGS. 1-4) to which the support arm arrangement is attached. The arrangement includes a pivotally mounted horizontal brush support arm 20 which is mounted for pivotal movement by a pair of vertically aligned bearings 22 and a vertical rod 23. The bearings 22 can be mounted on the overhead support means at a point overhead and inside the path of the vehicle to be washed or can be mounted outside of the path of the vehicle to be washed. A conventional motor and transmission (not shown) are arranged on the support arm 20 at an appropriate location for imparting rotary motion to the brush 10. The brushes are urged to a closed position in the path of the vehicle being washed by means of a pulley, cable and weight system which will be discussed further hereinafter with respect to FIG. 10. Other devices can be used to urge the brushes toward a closed position in the path of the vehicle to be washed.

A motor, chain and sprocket arrangement rotates a generally vertical upper drive shaft 30 which is mounted for rotational movement within a housing 31. The housing 31 is pivotally connected with the arm 20 for movement about a horizontal pivot axis 32. Thus, the upper shaft is capable of swinging movement corresponding to arrows 33. A shock absorber can be used to limit the swinging movement of the housing 31, however, because of the unique flexible nature of the brushes of the present invention the use of such shock absorbers may not be necessary. In the past, such shock absorbers have been used to counteract the bouncing movement of the brushes whereby the brushes bounce away from a vehicle when the vehicle contacts the brushes. Such a bouncing movement is reduced in accordance with the present invention and therefore the shock absorbers can be eliminated if desired. The upper drive shaft 30 is connected with a lower rotatable steel cable 34 by means of a yieldable coupling device 50. The yieldable coupling device is formed from an upper plate 50a and a lower plate 50b. The upper and lower plates are spaced apart and are loosely connected by six rigid connecting members 50c, such as a nut and bolt arrangement. Because of the space between the upper plate 50a and the lower plate 50b, the plates can tilt relative to one another when the brush is displaced by contact with a vehicle. Various types of yieldable coupling devices can be utilized in accordance with the present invention. However, because of the flexible nature of the brushes, the yieldable coupling device can be eliminated if desired. The preferred coupling device is disclosed in more detail in an application to James W. Roncaglione entitled, VEHICLE WASHING APPARATUS HAVING A YIELDABLE BRUSH SHAFT COUPLING, Ser. No. 415,928 filed on Sept. 8, 1982. The entire contents of this application are hereby expressly incorporated by reference.

Figure 5:
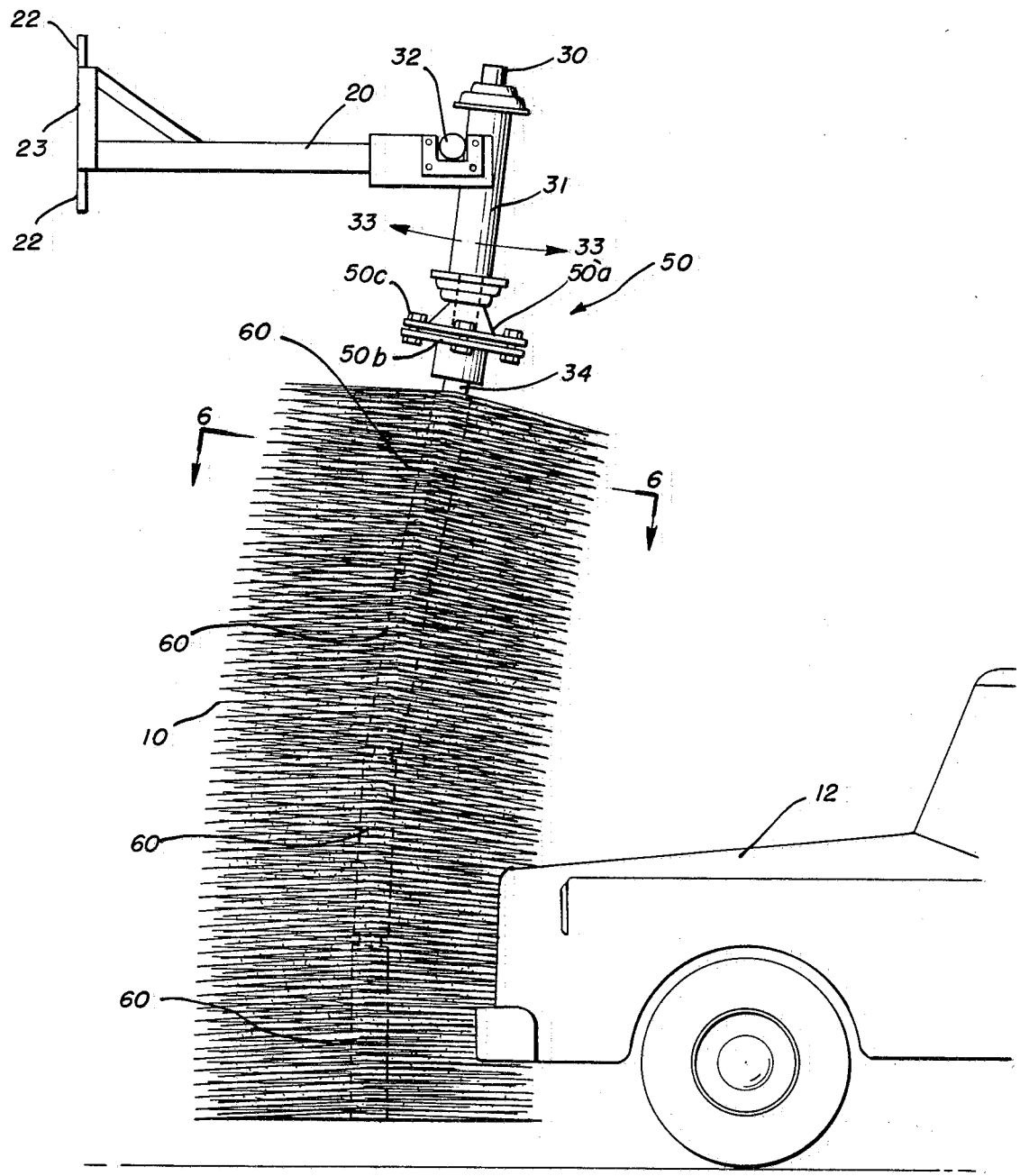
FIG. 5 is a side view showing the flexing of the vehicle washing brush and the pivoting of the brush mounting when a vehicle contacts the brush.

The improved vehicle washing brush includes a cable 34, preferably a metal cable, and a plurality of washing material support members which are secured to the cable. The diameter of the metal cable may vary depending upon the size and weight of the brushes, the length of the brushes and the mounting arrangement for the brushes. A cable of 1½ inch diameter has been found to be useful. Thus, when relatively large brushes are utilized, a diameter of ½ inch to 4 inches is contemplated, preferably about ⅞ inch to 2½ inches. Smaller diameter cables may be used for smaller brushes. FIG. 5 illustrates a brush having four elongate tubular shaped rigid support members 60. The support members 60 are securely fastened to the metal cable 34. When a vehicle contacts the brush, the support members can move relative to one another whereby the brush can bend and conform to the side surfaces of a vehicle being washed. Preferably, a small space is provided between the washing material support members so that the washing material support members can move with respect to one another when the metal cable flexes. Flexible brushes of the type disclosed in application Ser. No. 493,395 filed on May 10, 1983, now U.S. Pat. No. 4,510,639, VEHICLE WASHING APPARATUS HAVING FLEXIBLE BRUSHES in the name of James W. Roncaglione can also be utilized in accordance with the present invention. The entire contents of this application are hereby expressly incorporated by reference.

Figure 6:
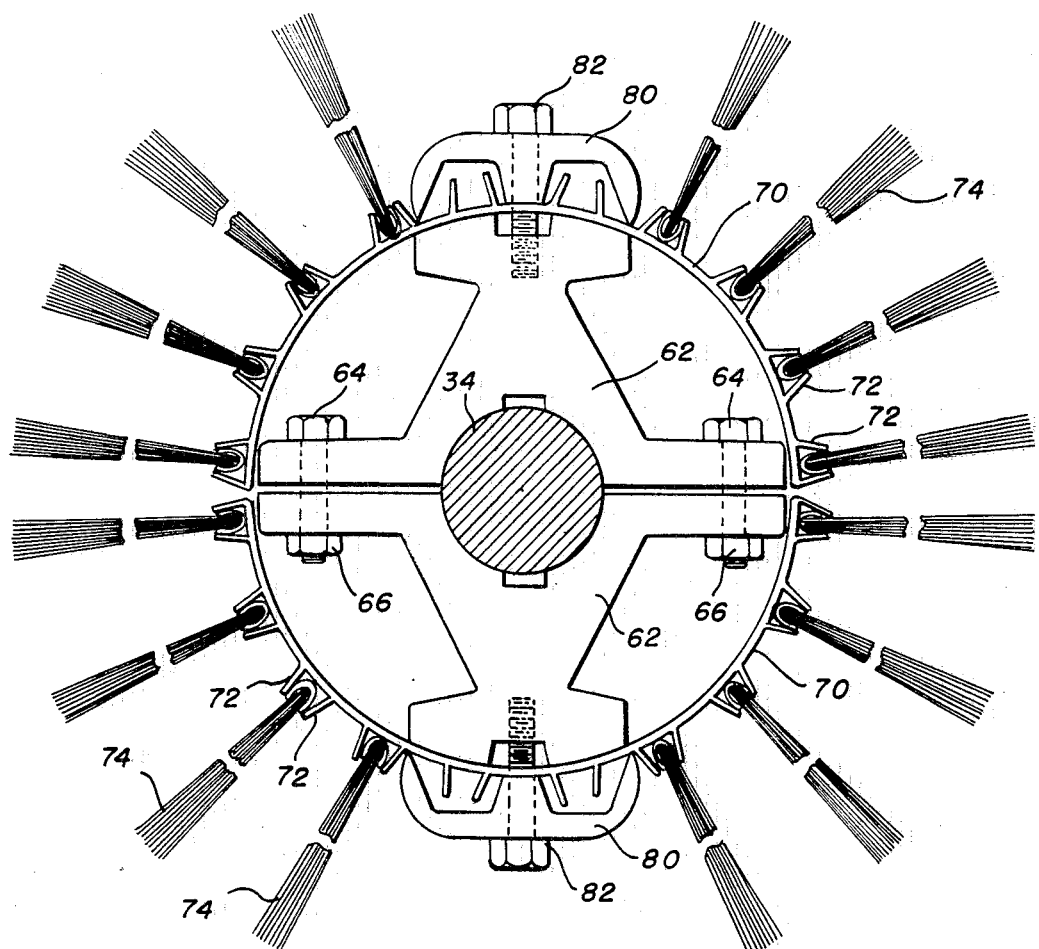
FIG. 6 is an enlarged cross-sectional view of the bracket and bristle holder arrangement taken through line 6—6 of FIG. 5.
Figure 7:
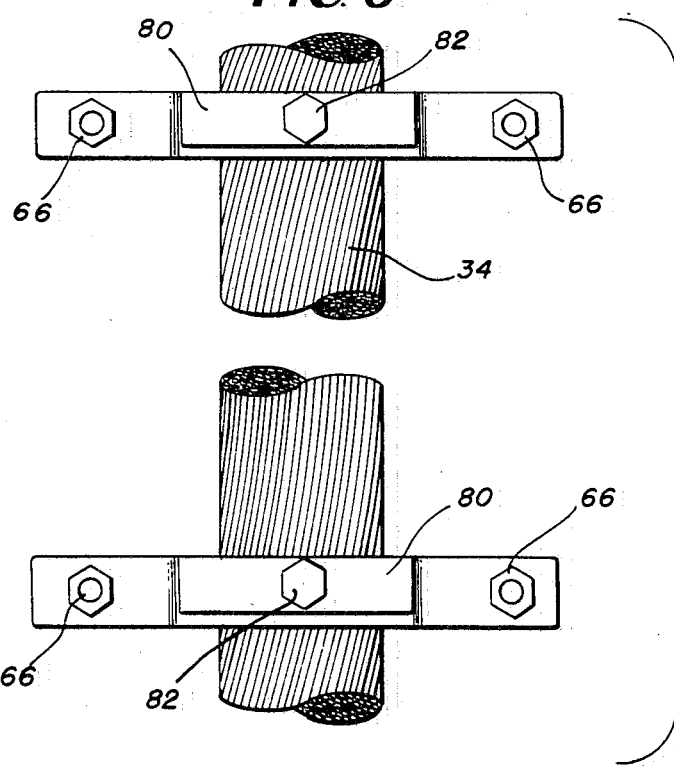
FIG. 7 is a side view of FIG. 6 with the bristle holder member removed.

As shown in FIGS. 6 and 7, the vehicle washing support members include a pair of inner clamping members 62 which are securely fastened to the steel cable 34 by a pair of bolts 64 and nuts 66. The inner clamping members 62 are securely fastened to the cable 34 so that when the cable is rotated the rotational movement is transmitted to the inner clamps 62. The washing material support members also include a pair of elongate semicircular trough shaped bristle support members 70 which are secured to the inner clamp members 62. The bristle support members 70 are provided with bristle holder fingers 72 which hold bristle material 74 therein. Thus, the two bristle support members 70 form a generally tubular configuration 60 as shown in FIG. 5. The washing material support members also include a pair of outer clamps 80 which secure the bristle support members 70 to the inner clamp members 62. The outer clamps are secured to the inner clamps by a bolt 82. FIG. 7 is a side view of the washing material support member with the bristle holders 70 removed. Thus, each generally tubular washing material support member 60 (which is formed by a pair of bristle holder support members 70) is supported at each end by the clamping arrangement shown in FIG. 6. It is clear that other types of washing material support members can be utilized in accordance with the present invention other than the preferred support member shown in FIGS. 6 and 7.

Figure 8:
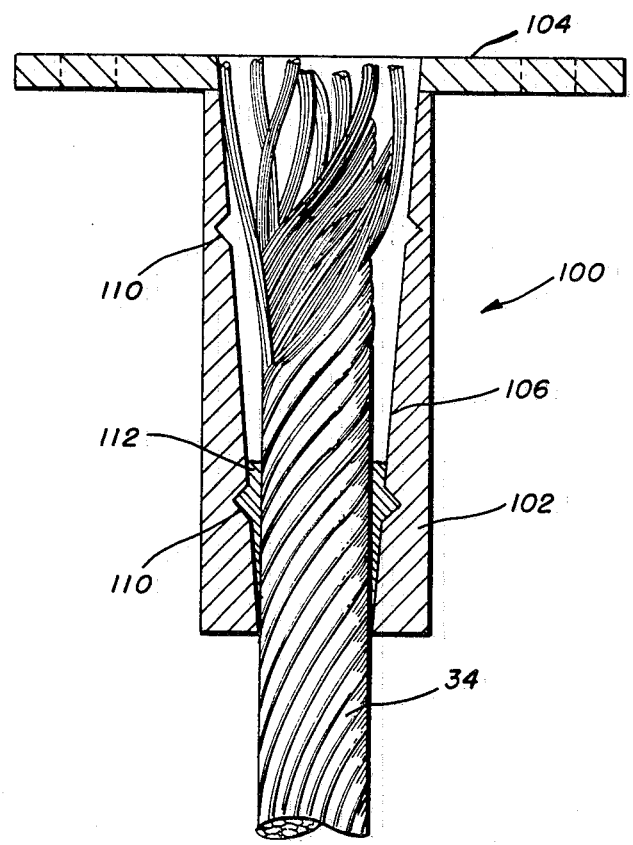
FIG. 8 is a cross-sectional view which shows the connection between the steel cable and the cable coupling member.
Figure 9:
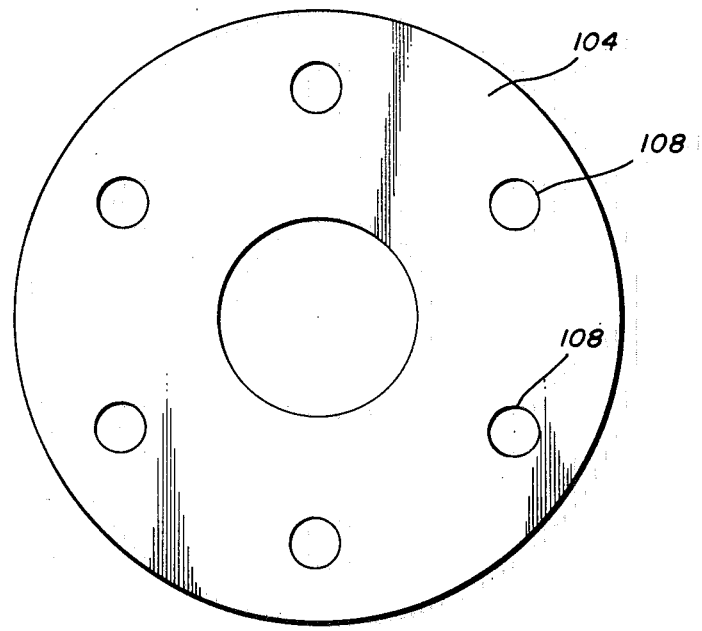
FIG. 9 is a top view of the coupling member of FIG. 8.

FIG. 8 shows a preferred arrangement for coupling the metal cable to a coupling member. The coupling member 100 preferably comprises a generally tubular portion 102 and a plate shaped upper portion 104. The tubular portion 102 contains a truncated cone-shaped cavity 106 which is adapted to receive one longitudinal end of the metal cable 34. The upper disc-shaped plate 104 contains six radially spaced holes 108. Thus, the coupling member can be connected to the means for rotating the brush by means of six bolt and nut arrangements. The truncated cond-shaped cavity 106 preferably contains a pair of circular V-shaped grooves 110 on the inner surface thereof. The purpose of these grooves is to allow a bonding material to securely bond the metal cable 34 to the coupling member 100. Alternatively, projections can be provided on the inner surface of the cavity to accomplish a similar result.

The coupling member is produced by inserting one end of the metal cable 34 into the cavity 106. After the cable is in the cavity, the individual strands of the metal cable are pulled apart and frayed to increase the surface area and to increase the diameter of one end of the cable. After the cable is pulled part and frayed, the strands are cleaned with an appropriate solvent and dried. Thereafter, a bonding material 112 is poured into the cavity. The bonding material is preferably a molten metal such as molten zinc or molten lead. However, the bonding material can be any other type of liquid bonding material which hardens after it is poured into the cavity. FIG. 8, for ease of illustration, shows the cavity only partially filled. However, it is preferable to fill the cavity to the top with a bonding material. By utilizing the improved coupling of the present invention a strong joint for rotating the metal cable can be formed. Since the brush assemblies to be rotated can weigh about 800 pounds, a strong bond is necessary to connect the metal cable with the coupling member.

Figure 10:
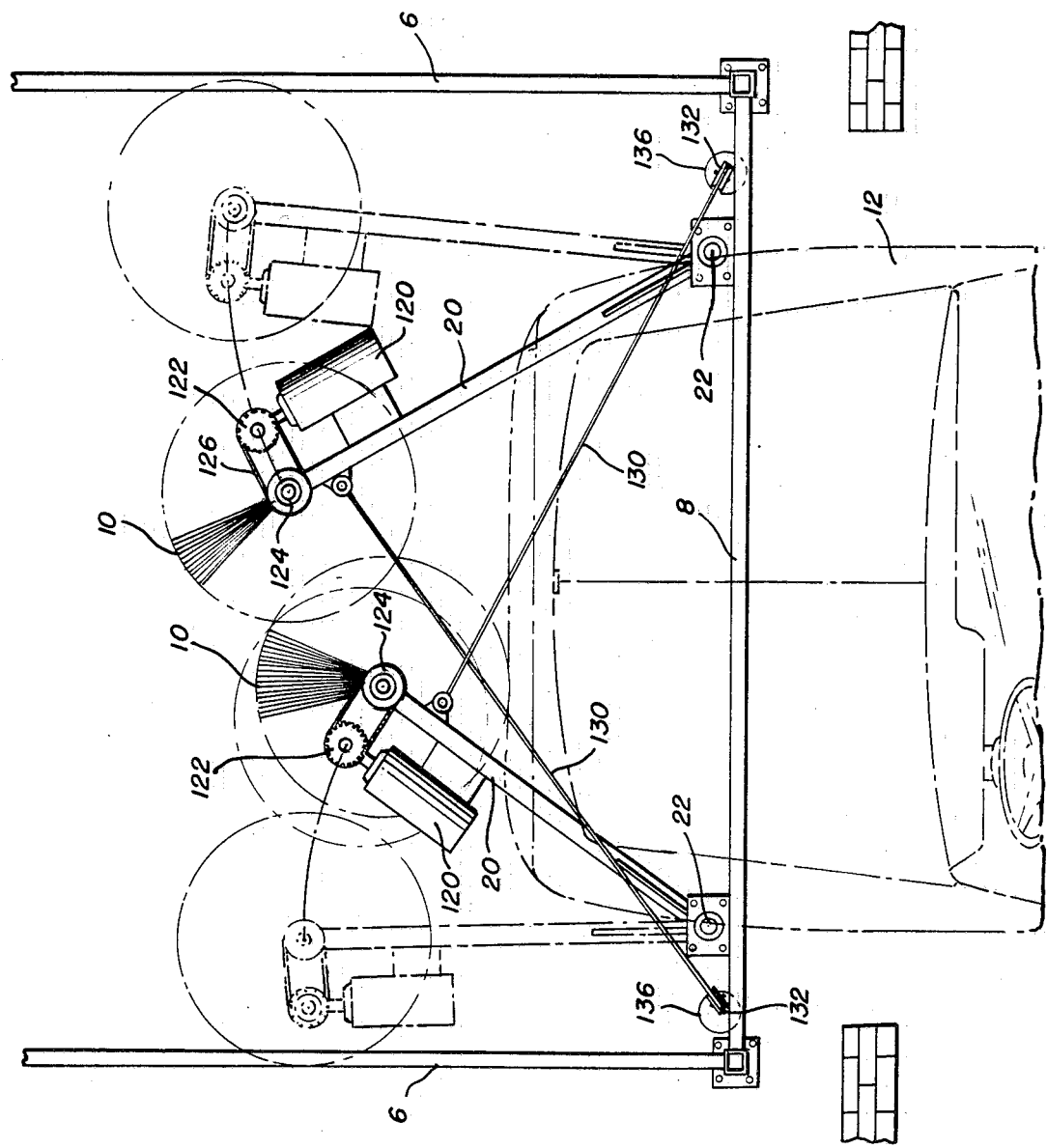
FIG. 10 is a top view of the apparatus shown in FIGS. 1-4.

FIG. 10 is a top view which shows the mounting for the brushes of the present invention. The reference numerals in FIG. 10 are the same as in FIG. 5. FIG. 10 also shows a motor 120, sprocket 122, 124 and chain 126 arrangement which can be utilized to rotate the brushes. The brushes are preferably urged toward each other by a cable 130, pulley 132, and weight 136 arrangement. Before a vehicle enters the apparatus the brushes are in a first closed position whereby the brushes are in the path of the vehicle to be washed. When the vehicle passes through the apparatus, the brushes contact the vehicle and swing apart to a second opened position whereby the vehicle passes between the brushes. FIG. 10 shows the brushes in the first closed position and in the second fully opened position. However, as shown in FIGS. 1-4, it is not necessary for the brushes to swing fully apart because of the flexible nature of the brushes and the flexible coupling which couples the brushes with the means for rotating the brushes. Thus, when the two brushes are contacting the sides of the vehicle, the tops of the brushes may be closer together than the bottoms of the brushes. This arragement is shown in FIGS. 2-4. By utilizing the flexible brushes of the present invention which are made from metal cables the brushes can more easily conform to the surfaces of the vehicle being washed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:
1. A vehicle washing apparatus, comprising:
overhead support means located above or adjacent to the path of a vehicle to be washed;
an elongate vertically disposed flexible and rotatable washing member having a free lower end and being supported at the upper end thereof by said support means, said washing member comprising a flexible elongate cable, a plurality of washing material support members secured to said cable, and washing materials supported by said support members; and
rotating means for imparting rotary motion to the upper end of said rotatable washing member.
2. A vehicle washing apparatus according to claim 1, wherein said washing material support members are brush clamps.
3. A vehicle washing apparatus according to claim 2, wherein said brush clamps are tightly secured to said cable.
4. A vehicle washing apparatus according to claim 1, and further including means for allowing the upper end of said washing member to move out of the path of a vehicle being washed whereby said washing member contacts one end and the side of a vehicle passing through said apparatus.
5. A vehicle washing apparatus, comprising:
overhead support means located above the path of a vehicle to be washed;
an elongate vertically disposed flexible and rotatable washing member having a free lower end and being supported at the upper end thereof by said support means, said elongate washing member comprising a flexible elongate cable having washing material thereon; and
rotating means for imparting rotary motion to said rotatable washing member.
6. A vehicle washing apparatus, comprising:
overhead support means located above the path of a vehicle to be washed;
a pair of elongate vertically disposed flexible and rotatable washing members having a free lower end and being supported at the uppper end thereof by said support means, each of said washing members comprising a flexible elongate cable, a plurality of washing material support members secured to said metal cable, and washing material supported by said support members, wherein said washing members are moveable from a first closed position to a second open positioned when the washing members contact a vehicle to be washed; and
rotating means for imparting rotary motion to the upper end of said rotatable washing members.
7. A vehicle washing apparatus according to claim 6, wherein each of said washing members comprises an elongate metal cable, a plurality of clamp members tightly secured to said metal cable and washing material connected with said clamps.
8. A vehicle washing apparatus comprising:
overhead support means located above the path of a vehicle to be washed;
an elongate vertically disposed and rotatable washing member having a free lower end and being supported at the upper end thereof by said support means, said elongate washing member comprising a flexible elongate member having washing material thereon; and
rotating means for imparting rotary motion to said rotatable washing member.

* * * * *